United States Patent
Kakadia et al.

(10) Patent No.: US 9,686,204 B2
(45) Date of Patent: Jun. 20, 2017

(54) CAPACITY MANAGEMENT BASED ON BACKLOG INFORMATION

(71) Applicant: Verizon Patent and Licensing Inc., Basking Ridge, NJ (US)

(72) Inventors: Deepak Kakadia, Antioch, CA (US); Mingxing S. Li, San Jose, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 192 days.

(21) Appl. No.: 14/173,335

(22) Filed: Feb. 5, 2014

(65) Prior Publication Data

US 2015/0222560 A1    Aug. 6, 2015

(51) Int. Cl.
*H04L 12/863* (2013.01)
*H04L 12/813* (2013.01)
*H04L 12/873* (2013.01)

(52) U.S. Cl.
CPC ............ *H04L 47/50* (2013.01); *H04L 47/20* (2013.01); *H04L 47/522* (2013.01)

(58) Field of Classification Search
CPC .................................................. H04L 47/50
See application file for complete search history.

(56) References Cited

U.S. PATENT DOCUMENTS

| | | | |
|---|---|---|---|
| 6,246,256 B1* | 6/2001 | Liu et al. | 326/38 |
| 8,036,117 B1* | 10/2011 | Sindhu et al. | 370/230 |
| 8,261,029 B1* | 9/2012 | Marshak et al. | 711/158 |
| 2003/0112814 A1* | 6/2003 | Modali et al. | 370/412 |
| 2004/0098295 A1* | 5/2004 | Sarlay | G06Q 50/188 705/80 |
| 2005/0195740 A1* | 9/2005 | Kwon | 370/229 |
| 2007/0070907 A1* | 3/2007 | Kumar et al. | 370/235 |
| 2007/0249360 A1* | 10/2007 | Das et al. | 455/450 |
| 2007/0258365 A1* | 11/2007 | Das et al. | 370/230 |
| 2008/0175270 A1* | 7/2008 | Kataria et al. | 370/468 |
| 2011/0194426 A1* | 8/2011 | Fang et al. | 370/252 |

OTHER PUBLICATIONS

Wikipedia, "Little's Law", http://en.wikipedia.org/wiki/Little%27s_law, Jan. 31, 2014, 4 pages.

* cited by examiner

*Primary Examiner* — Robert M Morlan
*Assistant Examiner* — Nourali Mansoury (57) ABSTRACT

A device is configured to obtain backlog information from a network device. The backlog information indicates a backlog of a queue included in the network device. The device obtains settings information for the network device. The settings information indicates a setting of the queue. The device determines an adjustment to the setting of the queue based on the backlog information and the settings information. The device provides adjustment information, indicating the adjustment to the setting of the queue, to the network device for the network to adjust the setting of the queue.

20 Claims, 8 Drawing Sheets

CAPACITY MANAGEMENT BASED ON BACKLOG INFORMATION

BACKGROUND

Routers may require capacity management to ensure bandwidth is adequate to route data packets. A capacity management tool may measure an average bandwidth utilization on a router link by obtaining a byte count on a physical network interface at two different time periods and dividing the difference in byte counts by the time period. The capacity management tool may increase or decrease the bandwidth of the link based on the average bandwidth utilization of the router.

DETAILED DESCRIPTION OF PREFERRED EMBODIMENTS

The following detailed description of example implementations refers to the accompanying drawings. The same reference numbers in different drawings may identify the same or similar elements.

Using an average bandwidth utilization to allocate bandwidth to a router or other network device may result in inefficient and/or inaccurate capacity planning. For example, traffic processed by network devices may come in bursts. Information about these bursts may be lost using the average bandwidth utilization for capacity planning because the average bandwidth utilization may average out the bursts with times of low bandwidth utilization. Accordingly, these bursts may not be accounted for using the average bandwidth utilization. Moreover, simply increasing the bandwidth of a link may not be an efficient allocation of resources. In implementations described herein, network capacity planning may be based on backlog information of queues included in network devices, which may be a better indicator for bursts than are bandwidth utilization. The backlog information may be used to redistribute resources between overutilized queues and underutilized queues (e.g., by adjusting weights and/or queue lengths for the queues).

Figure 1:
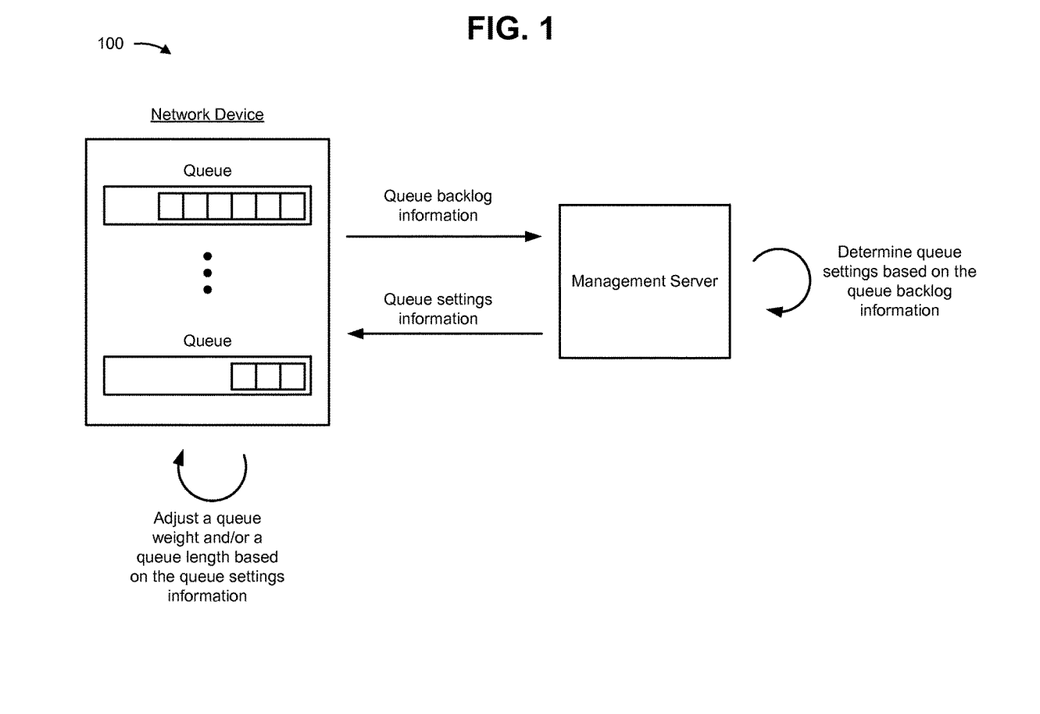
FIG. 1 is a diagram of an overview of an example implementation described herein.

FIG. 1 is a diagram of an overview of an example implementation 100 described herein. As shown in FIG. 1, a network device (e.g., a router, a gateway, a switch, etc.) may include multiple queues that store data packets waiting to be transmitted from the network device. Each queue may have a queue length indicating a quantity of data packets and/or an amount of data capable of being stored in a queue. Additionally, or alternatively, each queue may be associated with a weight indicating a proportion of the total bandwidth available to the network device that is used to transmit data stored in the queue.

The network device may determine queue backlog information indicating a backlog of each queue. For example, the network device may determine an average queue occupancy of each queue that indicates an average quantity of data packets (or an amount data) stored in a queue over an amount of time. The network device may transmit the queue backlog information to a management server.

The management server may receive the queue backlog information and determine queue settings information for the queues based on the queue backlog information. The queue settings information may indicate adjustments to the queue length and/or weight for queues included in the network device. For example, if the queue backlog information indicates a backlog of a queue is increasing and/or is at level that is problematic (e.g., the queue is overutilized), the management server may determine the queue length should be increased to allow more data packets to be stored. Additionally, or alternatively, the management server may determine the weight associated with an overutilized queue should be increased to increase an output rate of data packets from the queue, which may decrease the backlog. The management server may increase the weight to the overutilized queue by decreasing the weight associated with an underutilized queue. The management server may transmit the queue settings information to the network device.

The network device may receive the queue settings information from the management device and adjust the queue settings (e.g., the queue length and/or weight) based on the queue settings information.

In this way, the management server may redistribute resources within the network device to alleviate capacity problems for overutilized queues without increasing the bandwidth to the network device.

Figure 2A:
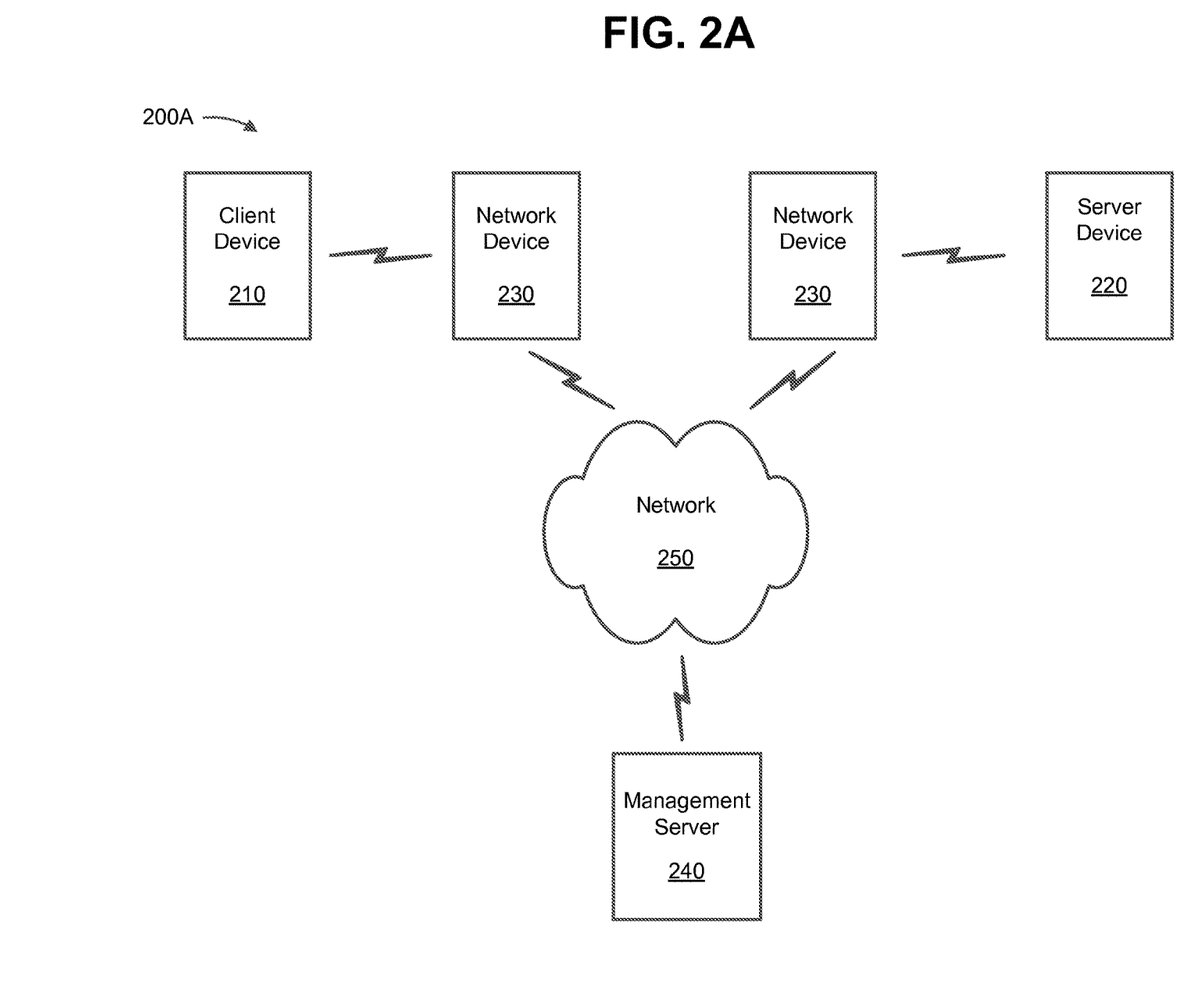
FIGS. 2A and 2B are diagrams of example environments in which systems and/or methods described herein may be implemented.

FIG. 2A is a diagram of an example environment 200A in which systems and/or methods described herein may be implemented. As shown in FIG. 2A, environment 200A may include a client device 210, a server device 220, a network device 230, a management server 240, and/or a network 250.

Client device 210 may include a device capable of receiving and providing information. For example, client device 210 may include a mobile phone (e.g., a smart phone, a radiotelephone, etc.), a computing device (e.g., a desktop computer, a laptop computer, a tablet computer, a handheld computer, a camera, an audio recorder, a camcorder, etc.), a machine-to-machine (M2M) device, or a similar device. In some implementations, client device 210 may include a communication interface that allows client device 210 to receive information from and/or transmit information to server device 220 and/or another device in environment 200A.

Server device 220 may include one or more devices capable of processing and/or routing information. In some implementations, server device 220 may include a communication interface that allows server device 220 to receive information from and/or transmit information to other devices in environment 200A.

Network device 230 may include one or more devices capable of receiving, providing, generating, storing, and/or processing information received and/or provided via a network (e.g., network 250) and/or another device (e.g., server device 220, client device 210, etc.). For example, network device 230 may include a computing device, such as a server. In some implementations, network device 230 may receive information from and/or provide information to client device 210 and/or server device 220. Additionally, or alternatively, network device 230 may include one or more devices capable of processing and/or transferring communications (e.g., a request, a response, etc.) between client device 210 and server device 220. For example, network device 230 may include a reverse proxy, a server (e.g., a proxy server), a traffic transfer device, a firewall, a router, a load balancer, a switch, or the like.

Management server 240 may include one or more devices capable of processing and/or routing information. In some implementations, management server 240 may include a communication interface that allows management server 240 to receive information from and/or transmit information to other devices in environment 200A.

Network 250 may include one or more wired and/or wireless networks. For example, network 250 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 250 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2A is provided for explanatory purposes. In practice, there may be additional devices and/or networks, fewer devices and/or networks, different devices and/or networks, or differently arranged devices and/or networks than those shown in FIG. 2A. Furthermore, two or more devices shown in FIG. 2A may be implemented within a single device, or a single device shown in FIG. 2A may be implemented as multiple, distributed devices. Additionally, one or more of the devices of environment 200A may perform one or more functions described as being performed by another one or more devices of environment 200A. Devices of environment 200A may interconnect via wired connections, wireless connections, or a combination of wired and wireless connections.

Figure 2B:
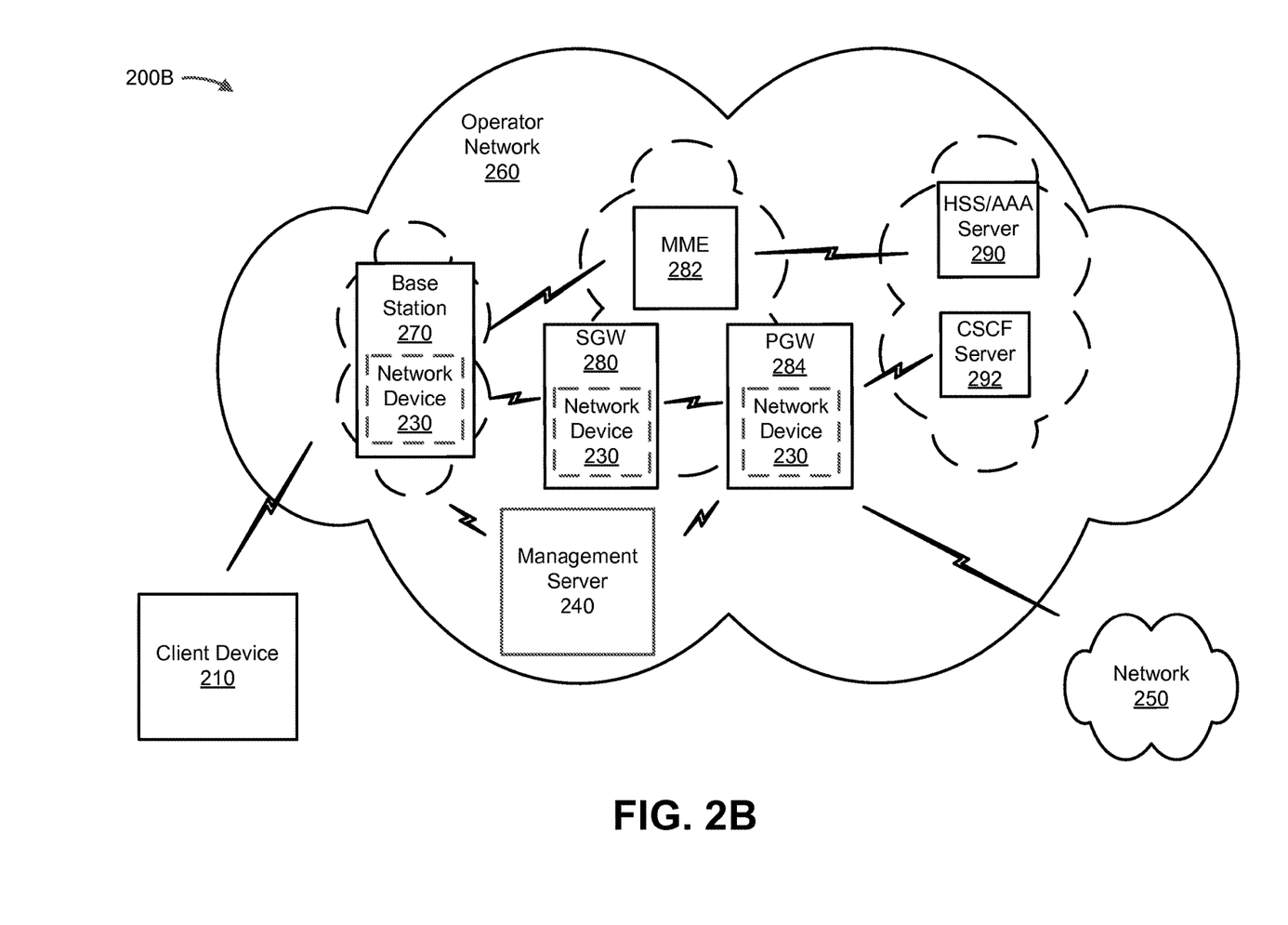

FIG. 2B is a diagram of an example environment 200B in which systems and/or methods described herein may be implemented. In example implementation 200B, network device 230 and/or management server 240 may be included in an operator network 260.

Operator network 260 may include a base station 270, a serving gateway 280 (hereinafter referred to as "SGW 280"), a mobility management entity device 282 (hereinafter referred to as "MME 282"), a packet data network (PDN) gateway 284 (hereinafter referred to as "PGW 284"), a home subscriber server (HSS)/authentication, authorization, accounting (AAA) server 290 (hereinafter referred to as "HSS/AAA server 290"), and/or a call session control function (CSCF) server 292 (hereinafter referred to as "CSCF server 292").

Operator network 260 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which client device 210 communicates with the EPC. The EPC may include SGW 280, MME 282, and/or PGW 284 that enables client device 210 to communicate with network 250 and/or an Internet protocol (IP) multimedia subsystem (IMS) core. The IMS core may include HSS/AAA server 290 and/or CSCF server 292 and may manage certain information and services, such as authentication, session initiation, account information, and/or a user profile, associated with client device 210. The LTE network may include multiple base stations 270, and the EPC may include multiple SGWs 280, MMEs 282, and/or PGWs 284. Additionally, or alternatively, operator network 260 may include a cellular network, a PLMN, a 2G network, a 3G network, a 4G network, a 5G network, and/or another network.

Base station 270 may include one or more network devices that receive, process, and/or transmit traffic, such as audio, video, text, and/or other data, destined for and/or received from client device 210. In an example implementation, base station 270 may be an eNB device and may be part of the LTE network. Base station 270 may receive traffic from and/or send traffic to network 250 via SGW 280 and PGW 284. Base station 270 may send traffic to and/or receive traffic from client device 210 via an air interface. One or more of base stations 270 may be associated with a RAN, such as the LTE network. In some implementations, base station 270 may function as network device 230.

SGW 280 may include one or more network devices, or other types of computation or communication devices, that gather, process, search, store, and/or provide information in a manner described herein. SGW 280 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 280 may, for example, aggregate traffic received from one or more base stations 220 and may send the aggregated traffic to network 250 via PGW 284. In one example implementation, SGW 280 may route and forward user data packets, may act as a mobility anchor for a user plane during inter-base station handovers, and may act as an anchor for mobility between LTE and other 3GPP technologies. In some implementations, SGW 280 may function as network device 230.

MME 282 may include one or more computation or communication devices that gather, process, search, store, and/or provide information in a manner described herein. For example, MME 282 may perform operations associated with a handoff to and/or from the EPS. MME 282 may perform operations to register a client device 210 with the EPS, to handoff client device 210 from the EPS to another network, to handoff client device 210 from the other network to the EPS, and/or to perform other operations. MME 282 may perform policing operations for traffic destined for and/or received from client device 210.

PGW 284 may include one or more network devices that gather, process, search, store, and/or provide information in a manner described herein. PGW 284 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 284 may, for example, provide connectivity of client device 210 to external packet data networks by being a traffic exit/entry point for a client device 210. PGW 284 may perform policy enforcement, packet filtering, charging support, lawful intercept, and packet screening. PGW 284 may also act as an anchor for mobility between 3GPP and non-3GPP technologies. PGW 284 may authenticate a client device 210 (e.g., via interaction with HSS/AAA server 290). In some implementations, PGW 284 may function as network device 230.

HSS/AAA server 290 may include one or more server devices, or other types of computation or communication devices, that gather, process, search, store, and/or provide information in a manner described herein. For example, HSS/AAA server 290 may manage, update, and/or store, in a memory associated with HSS/AAA server 290, profile information associated with a client device 210 that identifies applications and/or services that are permitted for and/or accessible by client device 210, bandwidth or data rate thresholds associated with the applications or services, information associated with a user of client device 210 (e.g., a username, a password, a personal identification number (PIN), etc.), a data plan, rate information, minutes allowed, and/or other information. Additionally, or alternatively, HSS/AAA server 290 may include a device that performs authentication, authorization, and/or accounting (AAA) operations associated with a communication session with a client device 210. With regard to the authentication operation, HSS/AAA server 290 may verify a device's (e.g., client device 210) specific digital identity provided via an identifier (e.g., a password, a digital certificate, a phone number, etc.) associated with the device. With regard to the authorization function, HSS/AAA server 290 may grant or refuse privileges to a device (e.g., client device 210) for accessing specific services (e.g., IP address filtering, address assignment, route assignment, quality of service (QoS), etc.). With regard to the accounting operation, HSS/AAA server 290 may track consumption of network resources (e.g., by client device 210) and may use this information for management, planning, billing, etc.

CSCF server 292 may include one or more server devices, or other types of computation or communication devices, that gather, process, search, store, and/or provide information in a manner described herein. CSCF server 292 may process and/or route calls to and from client device 210 via the EPC. For example, CSCF server 292 may process calls, received from network 250, that are destined for client device 210. In another example, CSCF server 292 may process calls, received from client device 210, that are destined for network 250.

CSCF server 292 may also include a policy and charging rules function (PCRF) that may perform operations that enforce EPS policies associated with a communication session with a client device 210. For example, the PCRF may dynamically provide real-time bandwidth allocations and/or controls (e.g., associated with a particular access point name (APN)) associated with particular applications, network accesses, and/or services provided to client device 210 during a communication session. The PCRF may also dynamically provide a real-time signal flow policy to adapt to changing conditions within the network and/or to manage traffic flow during the communication session.

The number of devices and/or networks shown in FIG. 2B is provided for explanatory purposes. In practice, there may be additional devices and/or networks, fewer devices and/or networks, different devices and/or networks, or differently arranged devices and/or networks than those shown in FIG. 2B. Furthermore, two or more devices shown in FIG. 2B may be implemented within a single device, or a single device shown in FIG. 2B may be implemented as multiple, distributed devices. Additionally, one or more of the devices of environment 200B may perform one or more functions described as being performed by another one or more devices of environment 200B. Devices of environment 200B may interconnect via wired connections, wireless connections, or a combination of wired and wireless connections.

Figure 3:
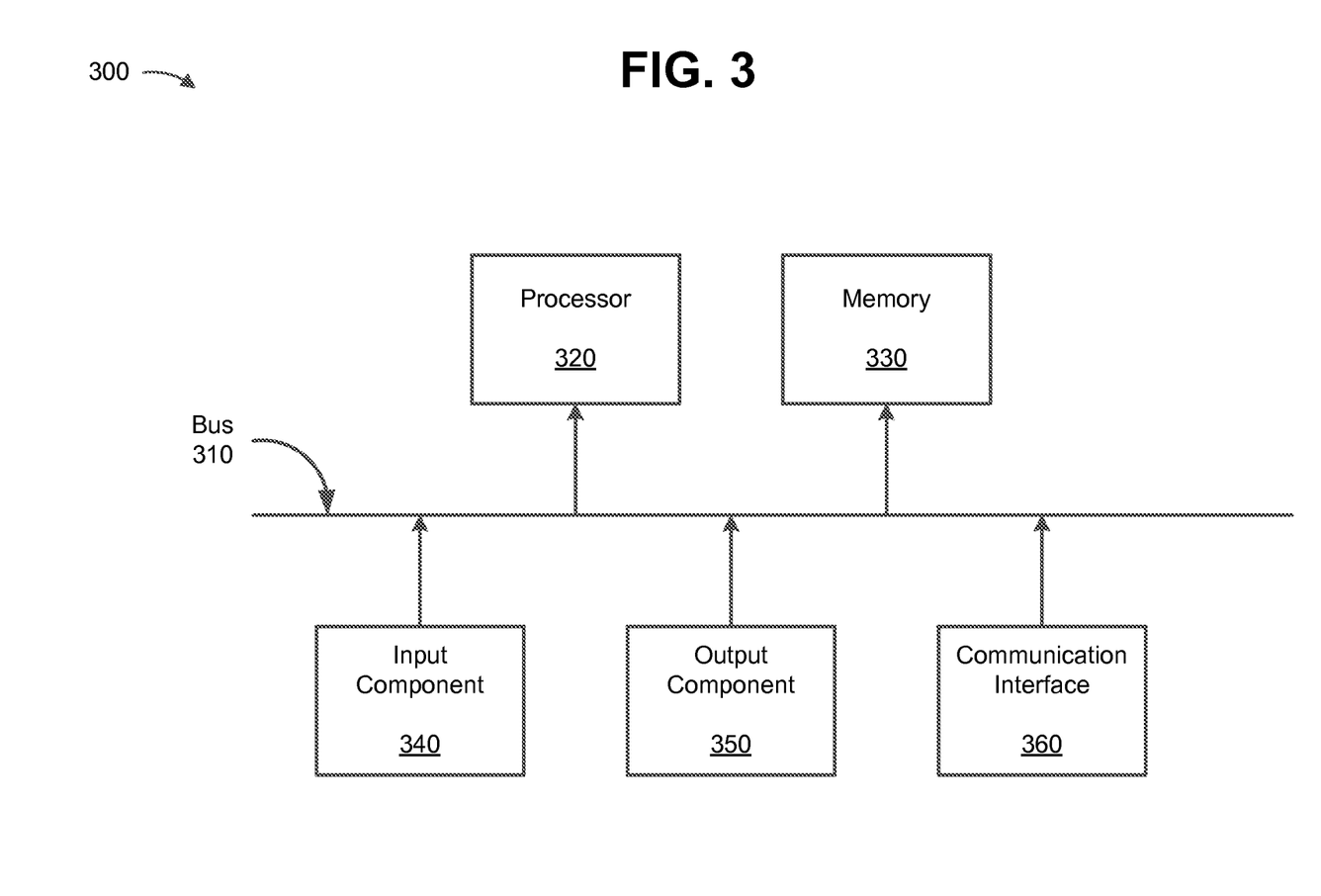
FIG. 3 is a diagram of example components of a device that corresponds to one or more devices of FIG. 2A and FIG. 2B.

FIG. 3 is a diagram of example components of a device 300 that corresponds to one or more devices of FIG. 2A and FIG. 2B. Device 300 may correspond client device 210, server device 220, network device 230, management server 240, base station 270, SGW 280, MME 282, PGW 284, HSS/AAA server 290, and/or CSCF server 292. Additionally, or alternatively, client device 210, server device 220, network device 230, management server 240, base station 270, SGW 280, MME 282, PGW 284, HSS/AAA server 290, and/or CSCF server 292 may include one or more devices 300 and/or one or more components of device 300.

As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.).

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
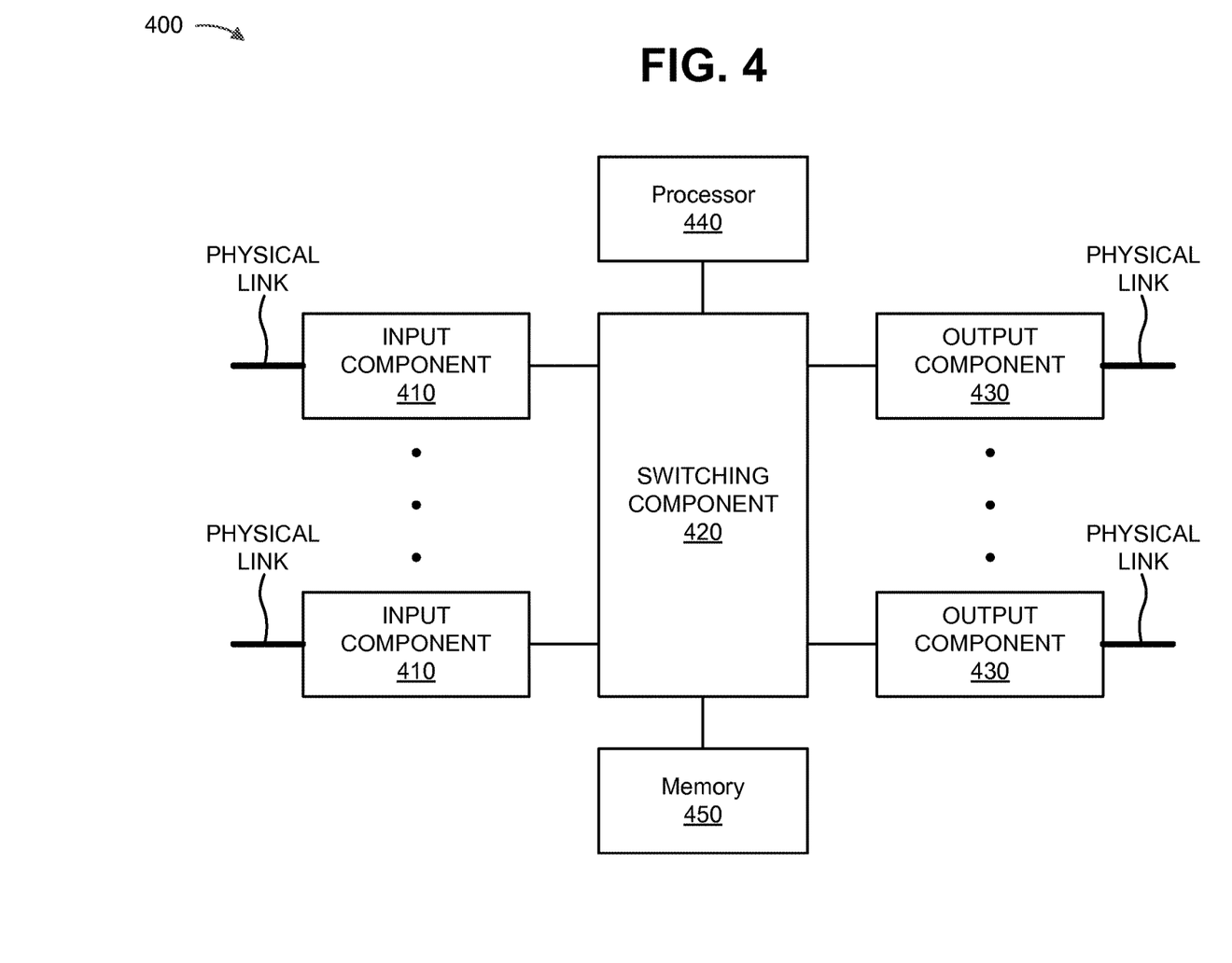
FIG. 4 is a diagram of example components of a device that corresponds to one or more devices of FIG. 2A and FIG. 2B.

FIG. 4 is a diagram of example components of a device 400 that corresponds to one or more devices of FIG. 2A and FIG. 2B. For example, device 400 may correspond to network device 230. Additionally, or alternatively, network device 230 may include one or more devices 400 and/or one or more components of device 400.

As illustrated in FIG. 4, device 400 may include input components 410, a switching component 420, output components 430, a processor 440, and/or a memory 450.

Input components 410 may be points of attachment for physical links and may be points of entry for incoming traffic, such as data packets. Input components 410 may process incoming traffic, such as by performing data link layer encapsulation or decapsulation. In some implementations, input components 410 may send and/or receive data packets.

Switching component 420 may interconnect input components 410 with output components 430. Switching component 420 may be implemented using many different techniques. For example, switching component 420 may be implemented via busses, via crossbars, and/or with shared memories (e.g., RAM, ROM, and/or another type of dynamic or static storage device). The shared memories may act as temporary buffers to store traffic from input components 410 before the traffic is eventually scheduled for delivery to output components 430. In some implementations, switching component 420 may enable input components 410, output components 430, processor 440, and/or memory 450 to communicate.

Output components 430 may store data packets and may schedule data packets for transmission on output physical links. For example, output components 430 may include memories or queues (e.g., RAM, ROM, and/or another type of dynamic or static storage device) that store the data packets waiting for transmission on the output physical links. Output components 430 may include scheduling algorithms that support priorities and guarantees. Output components 430 may support data link layer encapsulation or decapsulation, and/or a variety of higher-level protocols. In some implementations, output components 430 may send data packets and/or receive data packets.

Processor 440 may include one or more processors, microprocessors, ASICs, FPGAs, or similar types of processing components. In some implementations, processor 440 may communicate with other network devices 230, networks 250, and/or systems connected to environments 200A and/or 200B to exchange information regarding network topology. Processor 440 may create routing data structures based on the network topology information, create forwarding data structures based on the routing data structures, and forward the forwarding data structures to input components 410 and/or output components 430. Input components 410 and/or output components 430 may use the forwarding data structures to perform route lookups for incoming data packets. In some implementations, processor 440 may control settings for queues.

Memory 450 may include RAM, ROM, and/or another type of dynamic or static storage device (e.g., a flash, magnetic, or optical memory) that stores information and/or instructions for use by processor 440.

The number of components shown in FIG. 4 is provided for explanatory purposes. In practice, device 400 may include additional components, fewer components, different components, or differently arranged components than those shown in FIG. 4.

Figure 5:
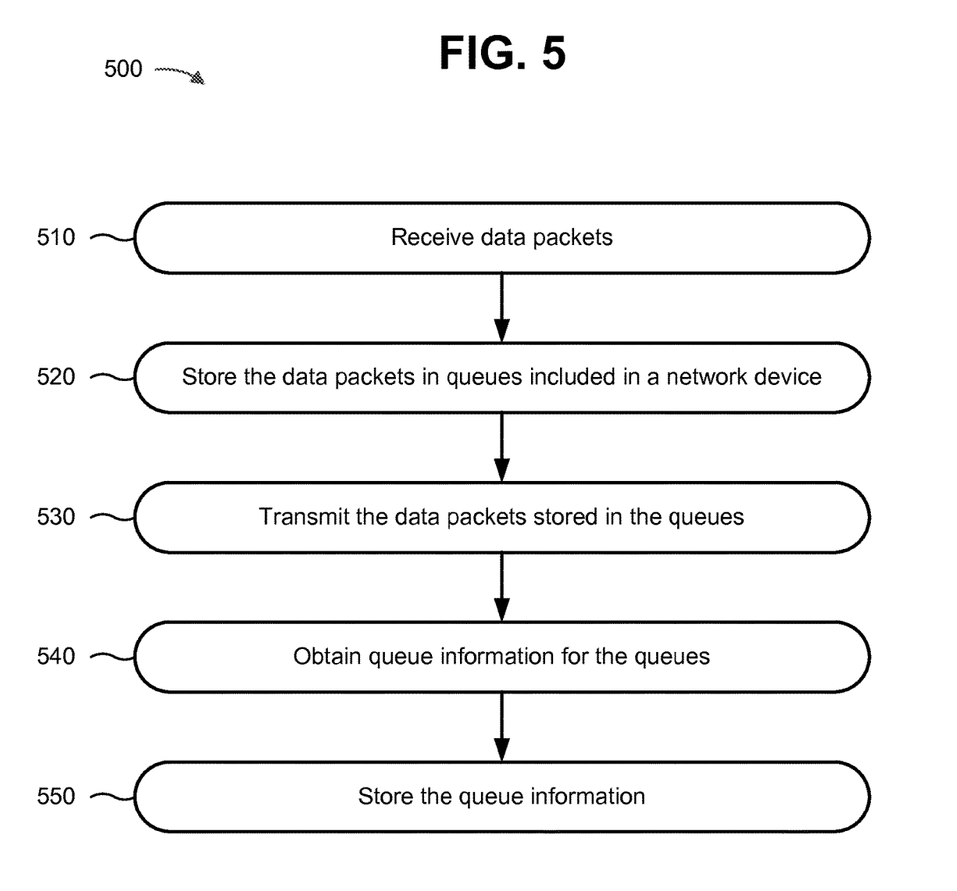
FIG. 5 is a flowchart of an example process for determining queue information for queues in a network device.

FIG. 5 is a flowchart of an example process 500 for determining queue information for queues in network device 230. In some implementations, one or more process blocks of FIG. 5 may be performed by network device 230. Additionally, or alternatively, one or more process blocks of FIG. 5 may be performed by another device or a group of devices separate from or including network device 230.

As shown in FIG. 5, process 500 may include receiving data packets (block 510). For example, network device 230 may receive data packets.

Client device 210 and/or server device 220 may send data packets to network device 230 for routing to one or more client devices 210 and/or one or more server devices 220. Network device 230 may receive data packets through input components 410 from multiple client devices 210 and/or server devices 220 for routing.

Each data packet may include priority information indicating a priority or a QoS for the data packet. Additionally, or alternatively, each data packet may include a destination identifier (e.g., a destination IP address) indicating a destination to which the data packet is to be sent. Network device 230 may read the priority information and the destination identifier included in the data packet.

As further shown in FIG. 5, process 500 may include storing the data packets in queues included in network device 230 (block 520). For example, network device 230 may store the data packets in queues included in network device 230.

Network device 230 may have multiple queues included in a memory of network device 230. A queue may store data packets received from input components 410 before the data packets are transmitted by output components 430. Each queue may be associated with a different output component 430 and/or a different QoS. For example, each queue may store data packets having a same QoS that are to be transmitted by a same output component 430.

Network device 230 may select a queue to store a data packet based on the priority information included in the data packet. For example, network device 230 may select a queue, associated with a QoS of the data packet, to store the data packet. Network device 230 may forward the data packet to the selected queue.

Network device 230 may store multiple data packets in each of the queues included in network device 230. A queue input rate for a queue may be an amount of data forwarded to the queue per a unit of time. For example, a queue input rate may correspond to a quantity of megabytes forwarded to the queue per second. Each queue may have a different queue input rate that is based on the quantity of data packets received by network device 230 and the QoS of the data packets received by network device 230. A queue input rate for a first queue may be independent of a queue input rate of a second queue. For example, if a greater quantity of data packets received by network device 230 have a first QoS than a second QoS, a queue associated with the first QoS may have a higher queue input rate than another queue associated with the second QoS.

As further shown in FIG. 5, process 500 may include transmitting the data packets stored in the queues (block 530). For example, network device 230 may transmit the data packets stored in the queues.

Output components 430 included in network device 230 may transmit data packets stored in the queues to network 250, another network device 230, client device 210, and/or server device 220 based on the destination identifier, the routing data structure, and/or the forwarding data structure.

Network device 230 may transmit data from the queues at different rates (i.e., queue output rates). A queue output rate may be based on a total bandwidth available to network device 230 and a weight associated with the queue. The weight associated with the queue may indicate a proportion of the total bandwidth which is available to transmit data stored in the queue. For example, assume a first queue is associated with a weight of 0.9 and a second queue is associated with a weight of 0.1. Thus, for every 9 units of data (e.g., bits, bytes, data packets, etc.) transmitted from the first queue, 1 unit of data will be transmitted from the second queue. The weights of each of the queues added together may equal 1 and/or 100% of the total bandwidth available.

As further shown in FIG. 5, process 500 may include determining queue information for each of the queues (block 540). For example, network device 230 may determine the queue information for each of the queues.

The queue information may indicate a queue length for each queue, a weight for each queue, a latency for each queue, and/or an average queue occupancy for each queue.

The queue length may indicate a quantity of data packets and/or an amount of data capable of being stored in a queue. If a queue becomes full (e.g., the amount data packets stored in the queue equals the queue length), the queue may drop data packets from the queue. The dropped data packets may not be transmitted by network device 230. The queue length may be a setting that may be changed by network device 230. Network device 230 may determine a queue length for a queue and set the queue length based on requirements for data packets stored in the queue and/or based on instructions received from management server 240.

The weight may indicate a proportion of total bandwidth available to transmit data stored in a queue. The weight may be a setting that may be changed by network device 230. Network device 230 may determine a weight for a queue and set the weight based on requirements for data packets stored in the queue and/or based on instructions received from management server 240.

The latency may indicate an amount of time data waits in a queue before being transmitted by network device 230. Network device 230 may determine a latency by calculating the latency. The latency may be based on a length of the queue, an input rate of the queue, and/or an output rate of the queue.

An average queue occupancy is an average quantity of data packets (or an amount of data) stored in a queue over an amount of time (e.g., 1 millisecond (ms), 10 ms, 100 ms, etc.). Put differently, a quantity of data packets stored in a queue (e.g., a backlog) may fluctuate during a period of time and the average queue occupancy is an average quantity of data packets stored at a given time in the queue during that period of time. More generally, the average queue occupancy may represent information about a backlog of a queue. Network device 230 may determine the average queue occupancy for each queue periodically (e.g., every 1 ms, 10 ms, 100 ms, etc.). For example, an ASIC may be used to determine a rate at which data packets received by network device 230 are being forwarded to each queue (e.g., an average effective arrival rate). Accordingly, Little's law (i.e., $L=\lambda W$) may be used to determine the average queue occupancy, where L is the average queue occupancy, $\lambda$ is the average effective arrival rate, and W is the average time or latency of a data packet in the queue.

A backlog may be created in a queue when a rate at which the data packets are stored in the queue (e.g., the queue input rate) exceeds a rate at which the data packets are transmitted from the queue (e.g., the queue output rate). The backlog may correspond to the data packets stored in the queue waiting to be transmitted.

Data packets received by network device 230 may be come in bursts. In other words, a rate at which data packets are received by network device 230 and stored in the queues (e.g., the queue input rate) may be higher than the queue output rate at some times and lower than the queue output rate at other times. Accordingly, when the queue input rate is higher than the queue output rate, a backlog of data packets may increase in a queue (e.g., the average queue occupancy may increase). On the other hand, when the queue input rate is lower than the queue output rate, a backlog of data packets may decrease in the queue (e.g., the average queue occupancy may decrease). In other words, the backlog of data packets may decrease when the queue output rate exceeds the queue input rate. Thus, the backlog, as indicated by the average queue occupancy, may constantly increase and decrease as the queue input rate changes.

As further shown in FIG. 5, process 500 may include storing the queue information (block 550). For example, network device 230 may store the queue information.

Network device 230 may store the queue information for each queue in a queue data structure included in a memory of network device 230. The queue data structure may associate a queue identifier (ID) identifying a queue with information indicating a queue length, a weight, a latency, and/or an average queue occupancy for the queue. In some implementations, the queue data structure may associate each queue ID with a QoS and/or requirements for data packets stored in the queue (e.g., a maximum allowable latency).

While a series of blocks has been described with regard to FIG. 5, the blocks and/or the order of the blocks may be modified in some implementations. Additionally, or alternatively, non-dependent blocks may be performed in parallel.

Figure 6:
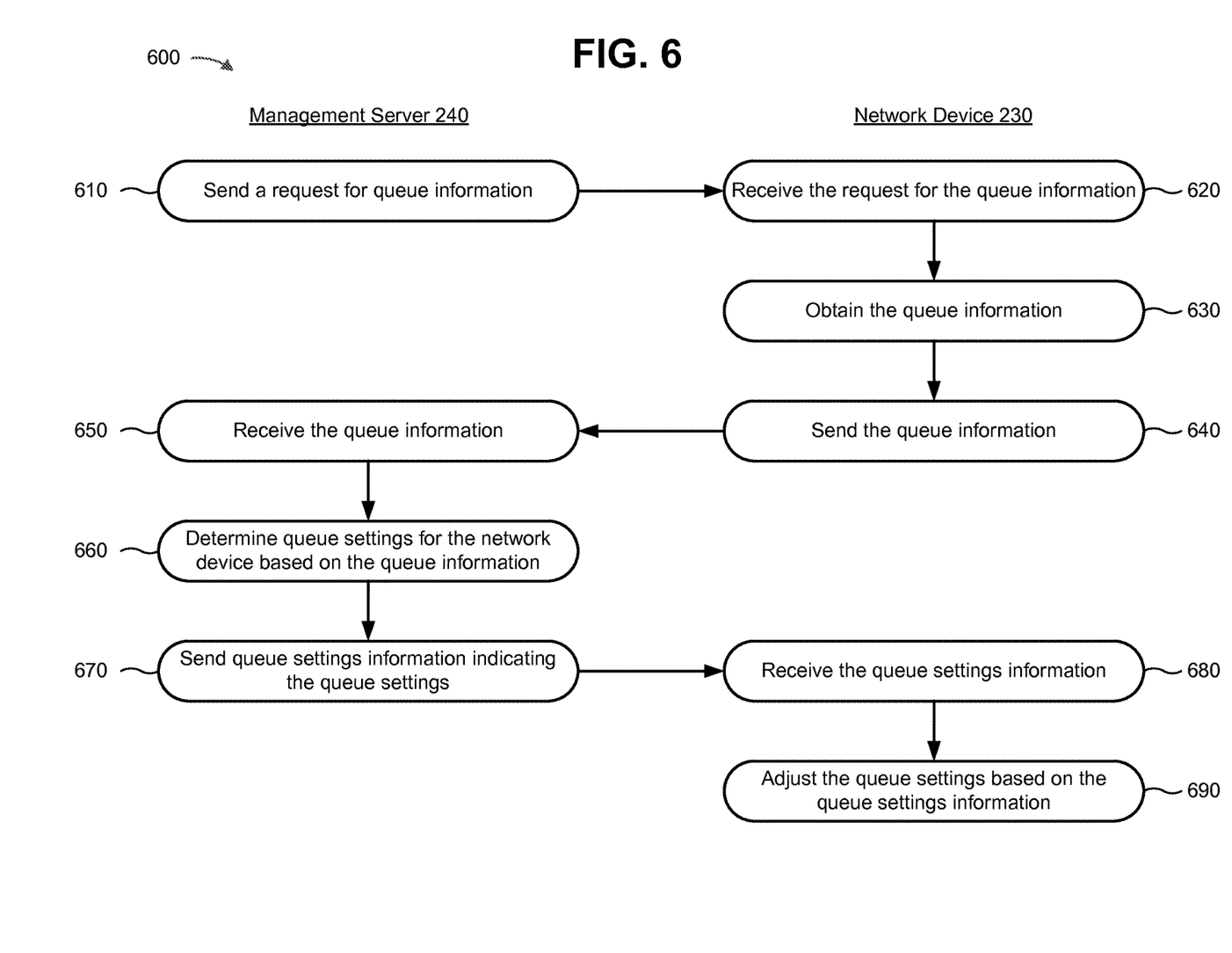
FIG. 6 is a flowchart of an example process for adjusting queue settings for queues in the network device.

FIG. 6 is a flowchart of an example process 600 for adjusting queue settings for queues in network device 230. In some implementations, one or more process blocks of FIG. 6 may be performed by network device 230 and/or management server 240. Additionally, or alternatively, one or more process blocks of FIG. 6 may be performed by another device or a group of devices separate from or including network device 230 and/or management server 240.

As shown in FIG. 6, process 600 may include sending a request for queue information to network device 230 (block 610). For example, management server 240 may send the request for the queue information to network device 230.

Management server 240 may generate a request that queue information, stored by network device 230, be provided to management server 240. Management server 240 may send the request to network device 230.

In some implementations, management server 240 may generate requests for and send the requests to a same network device 230 periodically (e.g., every 10 ms, every 100 ms, etc.). In some implementations, management server 240 may generate and send the requests at a time interval that is greater than a time interval that the network device 230 determines the average queue occupancy.

In some implementations, management server 240 may generate requests for and send requests to more than one network device 230. For example, management server 240 may manage a set of network devices 230.

As further shown in FIG. 6, process 600 may include receiving the request for the queue information from management server 240 (block 620). For example, network device 230 may receive the request from management server 240. In some implementations, network device 230 may receive requests from management server 240 periodically.

As further shown in FIG. 6, process 600 may include obtaining the queue information (block 630). For example, network device 230 may obtain the queue information.

In some implementations, network device 230 may obtain the queue information based on the request. Additionally, or alternatively, network device 230 may obtain the queue information independent of the request. For example, network device 230 may periodically obtain the queue information based on instructions stored in a memory of network device 230.

Network device 230 may obtain the queue information from the queue data structure included in the memory of network device 230. The queue information may include a queue ID for each queue associated with information identifying a queue length for the queue, a weight for the queue, a latency for the queue, and/or an average queue occupancy for the queue. In some implementations, the queue information may also, or alternatively, indicate requirements for data packets stored in each queue (e.g., a maximum latency) and/or indicate if data packets are being dropped from queues.

In some implementations, the queue information may indicate multiple average queue occupancies for each queue. For example, network device 230 may determine an average queue occupancy and store information indicating the average queue occupancy at a faster rate than management server 240 requests the queue information. Accordingly, network device 230 may store information indicating multiple average queue occupancies between requests received from management server 240 and include this information in the queue information. For example, network device 230 may determine an average queue occupancy for a queue every 1 ms. However, network device 230 may receive a request to provide queue information every 100 ms. Thus, network device 230 may have information indicating 100 average queue occupancies for each queue stored in the queue data structure when network device 230 receives the request from management server 240. Accordingly, network device 230 may obtain information indicating the 100 average queue occupancies and include information indicating the 100 average queue occupancies in the queue information.

As further shown in FIG. 6, process 600 may include sending the queue information to management server 240 (block 640). For example, network device 230 may send the queue information to management server 240.

In some implementations, network device 230 may send the queue information to management server 240 based on receiving the request. Network device 230 may send the queue information in response to each request received by network device 230 from management server 240.

Additionally, or alternatively, network device 230 may send the queue information independent of a request received from management server 240. For example, network device 230 may periodically send the queue information based on instructions stored in a memory of network device 230 (e.g., without requiring a request for the queue information from management server 240).

As further shown in FIG. 6, process 600 may include receiving the queue information from network device 230 (block 650). For example, management server 240 may receive the queue information from network device 230.

In some implementations, management server 240 may receive queue information from more than one network device 230. In other words, management server 240 may manage more than one network device 230. Management server 240 may store the received queue information in a memory of management server 240.

As further shown in FIG. 6, process 600 may include determining queue settings for network device 230 based on the queue information (block 660). For example, management server 240 may determine the queue settings based on the queue information.

Management server 240 may manage network device 230 and redistribute resources of network device 230 to efficiently utilize the queues. The queue information may indicate problems, such as average queue occupancy approaching a queue length and/or a latency of a queue being greater than or approaching an allowable latency for data packets in the queue. Accordingly, management server 240 may redistribute resources to correct these problems by determining and/or updating queue settings for network device 230. The queue settings may include settings for a queue length and/or a weight for each queue included in network device 230.

In some implementations, management server 240 may determine a setting for and/or an adjustment for a queue length of one or more queues included in network device 230. Management server 240 may obtain information identifying current queue lengths from the received queue information. Additionally, or alternatively, management server 240 may store information identifying current queue lengths in a memory of management server 240. Management server 240 may determine a queue length should be increased or decreased based on the queue information received from network device 230 (e.g., based on the average queue occupancy).

In some implementations, management server 240 may determine a setting for and/or an adjustment for a weight for one or more queues included in network device 230. Management server 240 may obtain information identifying current weights of queues from the received queue information. Additionally, or alternatively, management server 240 may store information identifying current weights of queues in a memory of management server 240. Management server 240 may determine a weight of a queue should be increased or decreased based on the queue information received from network device 230 (e.g., based on the average queue occupancy). Because the queue weights represent a proportion of total bandwidth, if a weight for a queue is increased, then a weight for one or more other queues may have be to decreased to compensate. Likewise, if a weight for a queue is decreased, then a weight for one or more other queues may have to be increased to compensate.

If the queue information indicates that a queue has an average queue occupancy approaching the queue length and/or is dropping data packets, management server 240 may determine that the queue length should be increased. Accordingly, more data packets may be stored in the queue and may prevent data packets from being dropped.

In some implementations, increasing the queue length may also increase a latency for the queue. Additionally, or alternatively, the queue information may indicate that a latency for the queue is greater than or approaching an allowable latency for the kind of data packets stored in the queue. Accordingly, if the latency is greater than or approaching an allowable latency for the kind of data packets stored in the queue, management server 240 may redistribute resources to decrease the latency for the queue. For example, management server 240 may decrease a queue length to decrease a latency. Additionally, or alternatively, management server 240 may determine the weight of the queue should be increased to increase a queue output rate of the queue and decrease the latency. Consequently, management server 240 may determine to decrease the weight of another queue or queues to compensate for the increase in weight to the queue. For example, management server 240 may select a queue to decrease the weight of the queue, and increase the latency of the queue, if the increased latency would still be below the allowable latency for the queue. Additionally, or alternatively, management server 240 may decrease the weight of a queue, thereby increasing the backlog for the queue, if the increased backlog of the queue (as indicated by the average queue occupancy) would still be at an allowable level (e.g., below the queue length). In some implementations, management device 240 may set and/or adjust both of a queue length and a weight for a queue.

Essentially, the weights and queue lengths of the queues included in network device 230 may be tuned to optimally process data packets. In other words, if a queue is being underutilized, resources (e.g., memory space, data packet processing resources, etc.) may be redistributed to another queue that is being overutilized.

In some implementations, management server 240 may determine settings for queues using models and/or forecasts management server 240 generates based on the queue information. For example, management server 240 may model the backlog of a queue based on the average queue occupancy and corrective action applied to the queue (e.g., a change in queue settings). Management server 240 may monitor the change of an average queue occupancy for a queue over time and forecast future backlogs and/or other problems. Accordingly, management server 240 may select settings for the queues to minimize an increase in the forecasted backlogs.

Additionally, or alternatively, management server 240 may use a linear regression technique to forecast future backlogs. For example, management server 240 may determine the average queue occupancy for a queue over time. For instance, the queue information received by management device 240 may include multiple average queue occupancies for a queue determined at different times. Management server 240 may perform a linear extrapolation of the multiple average queue occupancies to forecast future backlogs. Additionally, or alternatively, management server 240 may use average queue occupancies received in response to multiple requests for the linear extrapolation. Accordingly, management server 240 may select settings for the queues to minimize an increase in the forecasted backlogs.

In some implementations, management server 240 may use machine learning techniques to create long term algorithms for determining queue settings. For example, if management server 240 determines a queue setting effectively increases utilization of network device 230, management server 240 may enter the queue setting into long term predictive analytics to minimize future backlogs for a longer amount of time.

In some implementations, network device 230 may determine the queue settings.

In some implementations, queue settings for a first queue in a first network device 230 may affect the queue settings for a second queue in a second network device 230 (which connects to the first network device 230). For example, assume data packets output from the first queue in the first network device 230 are input to the second queue in the second network device 230. If the queue settings for the first queue are adjusted to increase the weight of the first queue, the output rate of data packets from the first queue may increase. Accordingly, the input rate of data packets into the second queue may increase based on the output rate of the data packets from the first queue increasing. Accordingly, the second queue in the second network device 230 may have an increased backlog of data packets due to the increased input rate. Accordingly, management server 240 may determine to increase the weight of the second queue to reduce the anticipated backlog. Likewise, if a queue length in the first queue is changed, a queue length of the second queue may be changed accordingly. Thus, management server 240 may determine queue settings for network device 230 based on the queue settings and/or an adjustment to queue settings in another network device 230.

In some implementations, management server 240 may increase the bandwidth to network device 230 if the queue settings may not be changed in a way to reduce backlog. For example, all the queues may be backlogged and no combination of setting weights and/or queue lengths may reduce the backlog for the queues. In such a case, management server 240 may increase the bandwidth of network device 230 which will increase the queue output rate for each queue included in network device 230. In some implementations, increasing the bandwidth may be a last resort if adjusting the queue settings is not effective in reducing backlog.

Additionally, or alternatively, the average queue occupancy may be determined at short enough intervals to indicate bursts in traffic. During these bursts, the backlog of data packets stored in queues may be much higher than normal and may result in data packets being dropped and/or an increase in latency. Management server 240 may increase the bandwidth accordingly so that the bandwidth is at level where the bursts can be handled without data packets being dropped and/or latency reaching prohibited levels. On the other hand, simply using average bandwidth utilization to determine a bandwidth setting may not account for these bursts because the bursts may be averaged out with times of low traffic, and the bandwidth may not be set to a level that accounts for the bursts of traffic.

As further shown in FIG. 6, process 600 may include sending queue settings information indicating the queue settings to network device 230 (block 670). For example, management server 240 may send the queue settings information to network device 230.

Management server 240 may generate the queue settings information based on the queue settings determined at block 660. The queue settings information may include a queue ID for each queue associated with information indicating settings and/or adjustments to the queue lengths and/or weights for one or more queues included in network device 230.

In some implementations, management server 240 may generate queue settings information for multiple network devices 230 and send the queue settings information to the multiple network devices 230.

As further shown in FIG. 6, process 600 may include receiving the queue settings information from management server 240 (block 680). For example, network device 230 may receive the queue settings information from management server 240.

As further shown in FIG. 6, process 600 may include adjusting the queue settings based on the queue settings information (block 690). For example, network device 230 may adjust the queue settings for queues based on the queue settings information.

Network device 230 may obtain information indicating queue settings for a queue from the queue settings information. Network device 230 may adjust queue settings for a queue identified by a queue ID according to the queue settings information associated with the queue ID. For example, the queue settings information may indicate a weight and/or a queue length for the queue. Network device 230 may adjust the weight and/or the queue length of the queue based on the queue settings information. Network device 230 may update the queue data structure to indicate the adjusted weight and/or queue length for the queue.

Network device 230 may process data packets based on the adjusted weight(s) and/or queue length(s) of one or more queues of network device 230.

In some implementations, process 600 may be repeated by management server 240 sending another request for queue information at block 610.

While a series of blocks has been described with regard to FIG. 6, the blocks and/or the order of the blocks may be modified in some implementations. Additionally, or alternatively, non-dependent blocks may be performed in parallel.

Figure 7A:
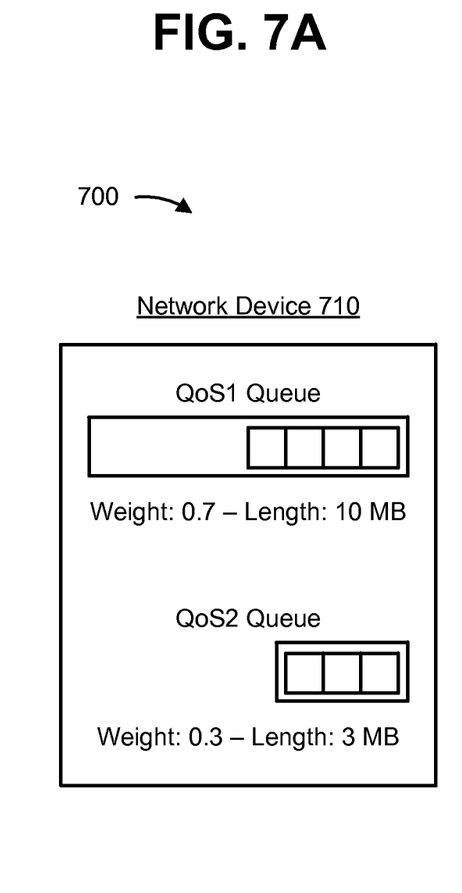
FIGS. 7A and 7B are diagrams of an example implementation relating to the example processes shown in FIGS. 5 and 6.
Figure 7B:
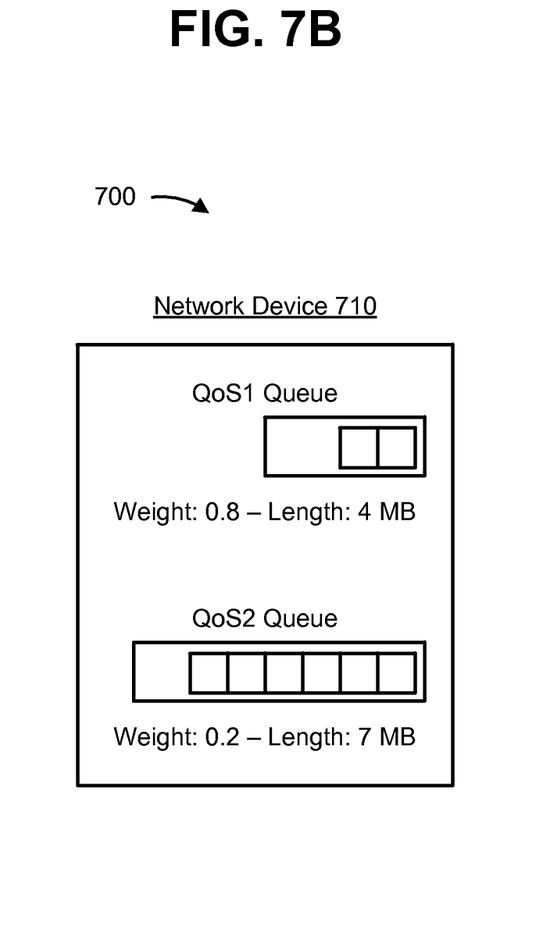

FIGS. 7A and 7B are diagrams of an example implementation 700 relating to example processes 500 and 600 shown in FIGS. 5 and 6.

As shown in FIG. 7A, assume a network device 710 includes a QoS1 queue storing first data packets associated with a first QoS, and a QoS2 queue storing second data packets associated with a second QoS. Accordingly, when network device 710 receives data packets for routing, network device 710 may forward the first data packets to the QoS1 queue and forward the second data packets to the QoS2 queue. Assume the first data packets have a first maximum allowable latency and the second data packets have a second maximum allowable latency. Assume that, the first maximum allowable latency is lower than the second maximum allowable latency because the first data packets are required to be transmitted at faster rate than the second data packets to achieve first QoS.

Additionally, assume the QoS1 queue has a queue length of 10 MB and is associated with a weight of 0.7. Further, assume the QoS2 queue has a queue length of 3 MB and is associated with a weight of 0.3. Accordingly, 7 bits are transmitted from the QoS1 queue for every 3 bits transmitted from the QoS2 queue.

Network device 710 may determine average queue occupancies for the QoS1 queue and the QoS2 queue. For example, assume network device 710 determines an average queue occupancy of 4 MB for the QoS1 queue and 3 MB for the QoS2 queue. Network device 710 may generate and send queue information to a management server. The queue information may indicate the queue length, the weight, the latency, and/or and the average queue occupancy for the QoS1 queue and the QoS2 queue.

The management server may receive the queue information and determine that the first data packets are experiencing latency above the first maximum allowable latency. However, the management server may also determine that the QoS1 queue has a queue length (e.g., 10 MB) longer than the average queue occupancy (e.g., 4 MB), and thus has a queue length larger than necessary.

The management server may also determine that the QoS2 queue is backlogged and has an average queue occupancy (e.g., 3 MB) equal to or approaching the queue length (e.g., 3 MB). Thus, some second data packets may be being dropped before being transmitted by network device 710. However, the management server may also determine that the latency for the QoS2 queue is less than the second maximum allowable latency, and that the latency of the QoS2 queue could be increased while still satisfying latency requirements for the second data packets.

The management server may reallocate network resources by determining the weight associated with the QoS1 queue should be increased (e.g., from 0.7 to 0.8) and the weight associated with the QoS2 queue should be decreased (e.g., from 0.3 to 0.2). Accordingly, the output rate of first data packets will increase and the latency of the first data packets will decrease (e.g., to a level below the first maximum allowable latency). Conversely, the output rate of second data packets will decrease and the latency of second data packets will increase, but increase to an acceptable level (e.g., a level still below the second allowable latency).

Additionally, or alternatively, the management server may determine the queue length of the QoS2 queue should be increased (e.g., from 3 MB to 7 MB). Accordingly, more second data packets may be stored in the QoS2 queue, avoiding second data packets from being dropped, and still satisfying latency requirements. Additionally, or alternatively, the management server may determine the queue length of the QoS1 queue should be decreased (e.g., from 10 MB to 4 MB) because the backlog of the first data packets did not require that large of a queue length.

The management server may generate queue settings information indicating the determined queue settings (e.g., the weight and queue length) for the QoS1 queue and the QoS2 queue. The management server may transmit the queue settings information to network device 710 and network device 710 may receive the queue settings information.

As shown in FIG. 7B, network device 710 may adjust the queue settings based on the queue settings information. Accordingly, the average queue occupancy of the QoS1 queue may decrease to 2 MB. Furthermore, the first data packets may have a decreased latency below the first maximum acceptable latency. Likewise, the average queue occupancy of the QoS2 queue may increase to 6 MB, which is below the adjusted queue length of 7 MB. Accordingly, second data packets may stop being dropped due to the queue length of the QoS2 queue being too small. Even though the backlog of the QoS2 queue may have increased, and latency for the second data packets may have increased, these may still be within the required levels because the QoS2 queue was previously underutilized.

Accordingly, the network resources of network device 710 may be efficiently redistributed to satisfy requirements for the first data packets and the second data packets without increasing the bandwidth of network device 710.

Implementations described herein may allow for efficient tuning of network resources by redistributing resources between overutilized queues and underutilized queues (e.g., by adjusting weights and/or queue lengths for the queues).

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   obtain backlog information from a network device,
      the backlog information indicating a respective backlog of each of a plurality of queues included in the network device,
         each of the plurality of queues being associated with a respective quality of service (QoS);
   obtain settings information for the network device,
      the settings information indicating a respective setting of each of the plurality of queues,
         the respective setting of each of the plurality of queues including queue weight information indicating queue weight,
         the queue weight indicating a respective proportion of a bandwidth available to a respective queue, of the plurality of queues, of a total bandwidth available to the network device for transmitting data;
   determine, based on the backlog information, forecast information that forecasts a respective future backlog of each of the plurality of queues;
   determine an adjustment to the respective setting of each of the plurality of queues based on the forecast information and the settings information,
      the adjustment being based on the respective QoS associated with each of the plurality of queues, and
      the adjustment including at least a first queue weight adjustment and a second queue weight adjustment,
         the first queue weight adjustment being an increase in a queue weight of a first queue of the plurality of queues, and
         the second queue weight adjustment being a decrease in a queue weight of a second queue of the plurality of queues; and
   provide adjustment information to the network device indicating the adjustment to the respective setting of each of the plurality of queues.

2. The device of claim 1, where the respective setting of each of the plurality of queues includes a queue length,
   the queue length indicating a respective capacity of each of the plurality of queues, and
   where the one or more processors, when determining the adjustment, are to:
      determine a queue length adjustment to increase or decrease the respective queue length of each of the plurality of queues.

3. The device of claim 1, where the backlog information indicates a respective average queue occupancy of each of the plurality of queues,
   the respective average queue occupancy indicating a respective average quantity of data stored in each of the plurality of queues over an amount of time.

4. The device of claim 1,
   where the one or more processors are further to:
      send a request to the network device to provide the backlog information, and
   where, when obtaining the backlog information, the one or more processors are to:
      receive the backlog information from the network device based on the request.

5. The device of claim 1, where the one or more processors are further to:
   increase the total bandwidth available to the network device based on the backlog information.

6. The device of claim 1, where the one or more processors are further to:
   obtain requirement information indicating a respective requirement for transmitting data stored in each of the plurality of queues,
      the requirement information indicating a respective maximum allowable latency for each of the plurality of queues; and
   where the one or more processors, when determining the adjustment to the respective setting of each of the plurality of queues, cause the one or more processors to:
      determine the adjustment to the respective setting of each of the plurality of queues based on the requirement information.

7. A non-transitory computer-readable medium storing instructions, the instructions comprising:
   a plurality of instructions that, when executed by a processor of a device, cause the processor to:
      receive backlog information from a network device,
         the backlog information indicating a respective backlog of each of a plurality of queues included in the network device, the backlog indicated by information identifying a respective average quantity of data stored in each of the plurality of queues over an amount of time, and
each of the plurality of queues being associated with a respective quality of service (QoS);
receive settings information for the network device,
the settings information indicating a respective setting of each of the plurality of queues,
the respective setting of each of the plurality of queues including queue weight information indicating queue weight,
the queue weight indicating a respective proportion of a bandwidth available to a respective queue, of the plurality of queues, of a total bandwidth available to the network device for transmitting data;
determine, based on the backlog information, forecast information that forecasts a respective future backlog of each of the plurality of queues;
determine a respective updated setting of each of the plurality of queues based on the forecast information and the settings information,
the respective updated setting being based on the respective QoS associated with each of the plurality of queues, and
the respective updated setting including at least a first queue weight adjustment and a second queue weight adjustment,
the first queue weight adjustment being an increase in a queue weight of a first queue of the plurality of queues, and
the second queue weight adjustment being a decrease in a queue weight of a second queue of the plurality of queues; and
transmit adjustment information, indicating the respective updated setting of each of the plurality of queues, to the network device for the network device to adjust the respective setting of each of the plurality of queues.

8. The non-transitory computer-readable medium of claim 7, where the plurality of instructions further cause the processor to:
increase the total bandwidth available to the network device based on the backlog information.

9. The non-transitory computer-readable medium of claim 7,
where the settings information comprises latency information indicating a respective latency of each of the plurality of queues; and
where the plurality of instructions, to determine the respective updated setting of each of the plurality of queues, cause the processor to:
determine the respective updated setting of each of the plurality of queues based on the latency information and the backlog information.

10. The non-transitory computer-readable medium of claim 7, where the plurality of instructions further cause the processor to:
obtain requirement information indicating a respective requirement for transmitting data stored in each of the plurality of queues; and
where the plurality of instructions, to determine the respective updated setting of each of the plurality of queues, cause the processor to:
determine the respective updated setting of each of the plurality of queues based on the requirement information.

11. The non-transitory computer-readable medium of claim 10, where the requirement information indicates a respective maximum allowable latency for each of the plurality of queues.

12. The non-transitory computer-readable medium of claim 7,
where the backlog information indicates a respective average queue occupancy of each of the plurality of queues,
the respective average queue occupancy indicating the respective average quantity of data stored in each of the plurality of queues over the amount of time.

13. A method, comprising:
storing, by a device, data in a plurality of queues for transmission to another device,
each of the plurality of queues being associated with a respective quality of service (QoS);
obtaining, by the device, backlog information,
the backlog information indicating a respective backlog of each of the plurality of queues;
providing, by the device, the backlog information to a server;
receiving, by the device, adjustment information from the server,
the adjustment information indicating an adjustment to a respective setting of each of the plurality of queues,
the respective setting of each of the plurality of queues including queue weight information indicating queue weight,
the queue weight indicating a respective proportion of a bandwidth available to a respective queue, of the plurality of queues, of a total bandwidth available to the device for transmitting data, and
the adjustment information being based on forecast information that forecasts a respective future backlog of each of the plurality of queues,
the forecast information being based on the backlog information,
the adjustment being based on the respective QoS associated with each of the plurality of queues, and
the adjustment including at least a first queue weight adjustment and a second queue weight adjustment,
the first queue weight adjustment being an increase in a queue weight of a first queue of the plurality of queues, and
the second queue weight adjustment being a decrease in a queue weight of a second queue of the plurality of queues; and
adjusting, by the device, the respective setting of each of the plurality of queues based on the adjustment information.

14. The method of claim 13, further comprising:
receiving a request from the server to provide the backlog information; and
where providing the backlog information comprises:
providing the backlog information to the server based on the request.

15. The method of claim 13, where obtaining the backlog information, comprises:
obtaining the backlog information from a data structure stored by the device.

16. The method of claim 13, where the backlog information indicates a respective average queue occupancy of each of the plurality of queues,
   the respective average queue occupancy indicating a respective average quantity of data stored in each of the plurality of queues over an amount of time.

17. The method of claim 13, further comprising:
providing settings information to the server,
   the settings information indicating a respective queue length of each of the plurality of queues, and
   the adjustment information being determined based on the settings information.

18. The method of claim 13, where the backlog information indicates a respective average queue occupancy of each of the plurality of queues, and
   where the method further comprises:
      determining the respective average queue occupancy of each of the plurality of queues based on a respective rate at which the data received by the device is stored in each of the plurality of queues.

19. The method of claim 13, further comprising:
receiving the data,
   the data being associated with priority information; and
forwarding the data to at least one of the plurality of queues for storage based on the priority information.

20. The method of claim 13, further comprising:
increasing the total bandwidth available to the device based on the backlog information.

* * * * *